United States Patent [19]

Hunter et al.

[11] 3,924,569
[45] Dec. 9, 1975

[54] APPARATUS FOR TREATING TIRE CORD FABRIC

[75] Inventors: Edward E. Hunter, Akron; Grover W. Rye, Cuyahoga Falls, both of Ohio

[73] Assignee: The Goodyear Tire & Rubber Company, Akron, Ohio

[22] Filed: Aug. 28, 1974

[21] Appl. No.: 501,413

[52] U.S. Cl. ..................... 118/642; 118/61; 427/55
[51] Int. Cl.² ............................................. B05B 5/00
[58] Field of Search ............ 118/642, 603, 49.5, 61, 118/68, 48; 427/55

[56] References Cited
UNITED STATES PATENTS

| | | | |
|---|---|---|---|
| 1,745,437 | 2/1930 | Motley | 118/61 |
| 3,250,248 | 5/1966 | Alexeff | 118/61 |
| 3,322,099 | 5/1967 | Valle | 118/642 |
| 3,595,205 | 7/1971 | Surprenant | 118/642 |

*Primary Examiner*—Mervin Stein
*Assistant Examiner*—Steven Hawkins
*Attorney, Agent, or Firm*—F. W. Brunner; H. E. Hummer

[57] ABSTRACT

An apparatus used in the treatment of tire cord fabric. The apparatus has means for applying on the fabric a liquid coating which is a mixture of an agent for promoting the bond between the cords of the fabric and rubber material used in the production of tires, and a vaporizable solvent which is a carrier of the agent. The apparatus is provided with a drying chamber including a boiling sump for filling the chamber with vapor of a solvent which is similar to the solvent of the liquid coating. Radiant heaters are used for drying the fabric by evaporating solvent carrier on the fabric, and at least one condenser is supplied for condensing solvent vapor in the drying chamber.

26 Claims, 2 Drawing Figures

APPARATUS FOR TREATING TIRE CORD FABRIC

BACKGROUND OF THE INVENTION

The invention is particularly well suited for use in treating tire cord fabric having warp cords composed of nylon, polyester, or metal. It is desirable coating such tire cords with an agent which impregnates the cords and promotes the bond between the cords and rubber material used in the production of tires. One such method advantageously employs a liquid solvent as a carrier for bringing the bonding agent into contact with the warp cords. This particular method has never been used to a great extent in the past, because of the high cost of the solvent and the inability to recapture a high percentage of the solvent after deposition of the agent on the warp cords. In some known processes, the tire cord fabric is dipped in a liquid mixture of solvent and agent and then passed into a chamber, filled with solvent vapor, where the fabric contacts hot cans or heated drums for vaporizing the solvent carrier on the fabric. The vaporized solvent is then removed and reconditioned for reuse in the process. Impurities, such as lint and processing oils on the fabric, react unfavorably when the fabric contacts the hot cans, causing undesirable deposits on the hot cans which necessitates occasional stoppage of the process to clean or replace the contaminated hot cans. Another known method employs superheated solvent vapor, rather than hot cans, for contacting the fabric to heat and evaporate the solvent carrier on the fabric, but this method normally involves using large quantities of fluid which are not easily disposed of. The invention is directed to providing an apparatus which is designed to remove the solvent carrier from the fabric by exposing the fabric to processing conditions which are different from those defined above.

Briefly stated, the invention is in an apparatus for treating tire cord fabric. Means are provided for coating tire cord fabric with a liquid mixture of an agent for promoting the bond between the cords of the fabric and rubber material used in the production of tires and a vaporizable solvent which is a carrier of the agent. The fabric is treated in a drying chamber which is sealed from the ambient atmosphere and the fabric coating means. The drying chamber has an inlet and outlet through which the fabric passes as it moves into and out of the drying chamber. Means are used for guiding the fabric successively through the fabric coating means and the drying chamber. Means are supplied for filling the chamber with vapor of a solvent which is similar to the solvent of the mixture. Condensers are included for condensing at least solvent vapor accumulating adjacent the outlet through which the fabric exits from the drying chamber. Radiant heaters are provided in the drying chamber for heating and vaporizing solvent carrier on fabric, as the fabric moves through the solvent vapor in the drying chamber.

DESCRIPTION OF THE DRAWING

The following description of the invention will be better understood by having reference to the annexed drawing, wherein.

DESCRIPTION OF THE INVENTION

Figure 1:
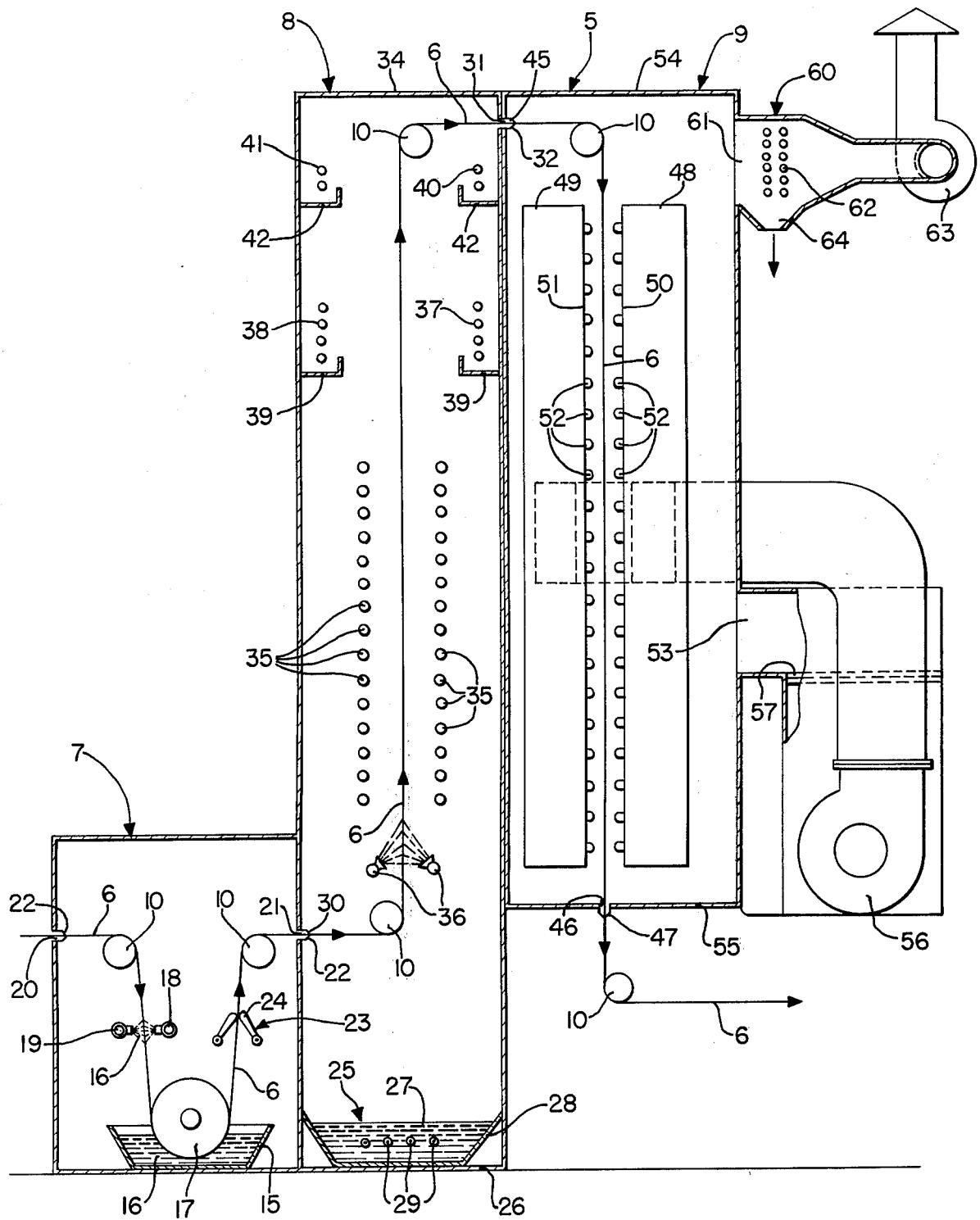
FIG. 1 is a cross-section of an apparatus designed in accordance with the invention and used for treating tire cord fabric.

Referring generally to the drawing and more particularly to FIG. 1, there is shown an apparatus 5 in which tire cord fabric 6 is treated with an agent for promoting the bond between the cords of the fabric 6 and rubber material used in the production of tires. The apparatus 5 essentially comprises, in succession, a dip chamber 7, a drying chamber 8, and a post-drying chamber 9. A number of rollers 10 are strategically located for successively guiding the fabric 6 through the chambers 7, 8, and 9.

The dip chamber 7 comprises a dip tank 15 containing a liquid coating 16 which is a mixture of the bonding agent and a vaporizable solvent which is chemically compatible with the agent and a carrier of the agent. The solvent, when vaporized, is preferably heavier than air. An applicator roll or drum 17 is rotatably mounted in the dip tank 15 and used for directing the fabric 6 into the liquid coating 16. A pair of nozzles 18 and 19 are provided in the dip chamber 7 for spraying liquid coating 16 on the fabric 6, prior to dipping the fabric 6 in the liquid coating 16. The spray nozzles 18 and 19 may be used alone without the drum 17 and dip tank 15, as an alternate method for applying liquid coating 16 on the fabric 6. The dip chamber 7 has entrance and exit openings 20 and 21 through which the fabric 6 passes, as it enters and leaves the dip chamber 7. Any suitable seal 22 is used in each of the openings 20 and 21 for sealing the dip chamber 7 from the ambient atmosphere and adjacent drying chamber 8. A scraper blade assembly 23, including a pair of wiper blades 24, is disposed in the dip chamber 7 between the dip tank 15 and fabric exit 21, for removing excess liquid coating 16 from the fabric 6, immediately after the fabric 6 leaves the dip tank 15.

The drying chamber 8 is vertically elongated and comprises a boiling sump 25 which is disposed adjacent the bottom 26 of the drying chamber 8. The boiling sump 25 contains a solvent 27 which is the same as the solvent for the liquid coating 16. The boiling sump 25 includes a tank 28 for holding the liquid solvent 27 and any suitable means, e.g. heat coils 29, for heating and vaporizing the liquid solvent 27 in the boiling sump 25 to fill the drying chamber 8 with solvent vapor and eliminate any fluid, such as air, which would have a deleterious effect on the processing conditions maintained in the drying chamber 8.

The drying chamber 8 is provided with inlet and outlet openings 30 and 31 through which the fabric 6 passes, as it enters and leaves the drying chamber 8. A seal 32 is provided in the fabric outlet 31 for sealing the drying chamber 8 from the ambient atmosphere and adjacent post-drying chamber 9. The exit opening 21 of the dip chamber 7 is the inlet opening 30 of the drying chamber 8. The fabric outlet 31 is preferably disposed adjacent the top 34 of the drying chamber 8.

The fabric 6 passes between radiant heaters 35 which are disposed in the drying chamber 8 intermediate the boiling sump 25 and the fabric outlet 31. The radiant heaters 35 each comprise a large, vertically disposed plate coil, or a pluraity of smaller, vertically stacked plate coils. In either case, the radiant heaters 35 are sufficiently large to vaporize solvent carrier on the fabric 6. A series of tube coils can be used in place of the plate coils. Any suitable heated fluid, e.g. steam, is circulated through the plate or tube coils to heat them to a temperature sufficient to vaporize solvent carrier on fabric 6 moving between the radiant heaters 35. It has been found that the fabric 6 will dry when it reaches a temperature of about 180° F. in an air-free atmosphere, or in a vaporous atmosphere of the solvent. A pair of jets 36 for directing streams of superheated vapor of a solvent, identical to, or preferably the same as the solvent of the liquid coating 16, can be used in combination with the radiant heaters 35 to evaporate solvent carrier on the fabric 6. In such cases, the jets 36 are preferably located below the radiant heaters 35, as shown in FIG. 1.

The fabric 6 continues upwardly from the radiant heaters 35, through a pair of primary condensers 37 and 38 which are disposed within the drying chamber 8 adjacent the fabric outlet 31. The condensers 37 and 38 are designed to condense solvent vapor accumulating near the fabric outlet 31. Any suitable means, including channel 39, are provided for removing condensed solvent vapor from the drying chamber 8 for reconditioning and reuse in the process. The reconditioning process is generally well known and comprises passing the condensed solvent through a conventional separator where the solvent is isolated from impurities such as water. The separated solvent, which is sufficiently free of impurities, is then pumped to a tank for storage and future use in a liquid mixture of bonding agent and solvent. Any suitable coolant, e.g. water, is circulated through the condensers 37 and 38.

The fabric 6 continues upwardly from the primary condensers 37 and 38, through secondary condensers 40 and 41 which are disposed between the primary condensers 37 and 38 and the fabric outlet 31. A refrigerated coolant, e.g. water, is circulated through the secondary condensers 40 and 41 which are provided for condensing any solvent vapor passing through the primary condensers 37 and 38. Means, including channels 42, are supplied for removing condensed solvent vapor from the secondary condensers 40 and 41 to the aforementioned separator where the solvent and impurities are separted.

The post-drying chamber 9 is also vertically elongated and includes entrance and exit openings 45 and 46 through which the fabric 6 passes, as it enters and leaves the post-drying chamber 9. The fabric outlet 31 of the drying chamber 8, is the entrance opening 45 of the post-drying chamber 9. A conventional flap seal 47 is provided in the exit opening 46 for sealing the post-drying chamber 9 from the ambient atmosphere.

The fabric 6 passes downwardly from the entrance opening 45, between a pair of vertically elongated plenums 48 and 49. The plenums 48 and 49 have confronting faces 50 and 51 which are in close proximity to fabric 6 guided therebetween. A plurality of horizontally elongated nozzles 52 are vertically spaced, preferably opposite each other on the confronting surfaces 50 and 51 of the heat plenums 48 and 49. The nozzles 52 are coextensive with the width of the fabric 6 and angularly disposed to the direction in which the fabric 6 moves between the heat plenums 48 and 49. The nozzles 52 are used for directing streams of heated fluid, e.g. air, against opposing sides of the fabric 6 as it moves between the heat plenums 48 and 49 to evaporate any solvent carrier remaining on the fabric 6.

A fluid intake 53 is disposed in the post-drying chamber 9 intermediate the top 54 and bottom 55 of the chamber 9. A fan 56 is coupled between the fluid intake 53 and each of the heat plenums 48 and 49 for drawing heated fluid from the post-drying chamber 9 through a heat exchanger 57 where the fluid is reheated for subsequent recirculation to the heat plenums 48 and 49. The heat exchanger 57 may be of any suitable design, e.g. a series of coils through which steam is circulated.

A system, generally indicated at 60, is associated with the post-drying chamber 9 and designed for exhausting fluid into the ambient atmosphere. The system 60 comprises an enlarged exhaust opening 61 adjacent the top 54 of the post-drying chamber 9. Any suitable condenser 62 is disposed within the discharge opening 61 for condensing solvent vapor drawn into the system 60 by a high-powered fan 63 which discharges the fluid, under pressure, into the ambient atmosphere. Solvent condensed by the condenser 62 is removed through a trough 64 from the post-drying chamber 9 to the separator where the impurities are removed from the solvent. Purified solvent is then reused in the apparatus 5.

Figure 2:
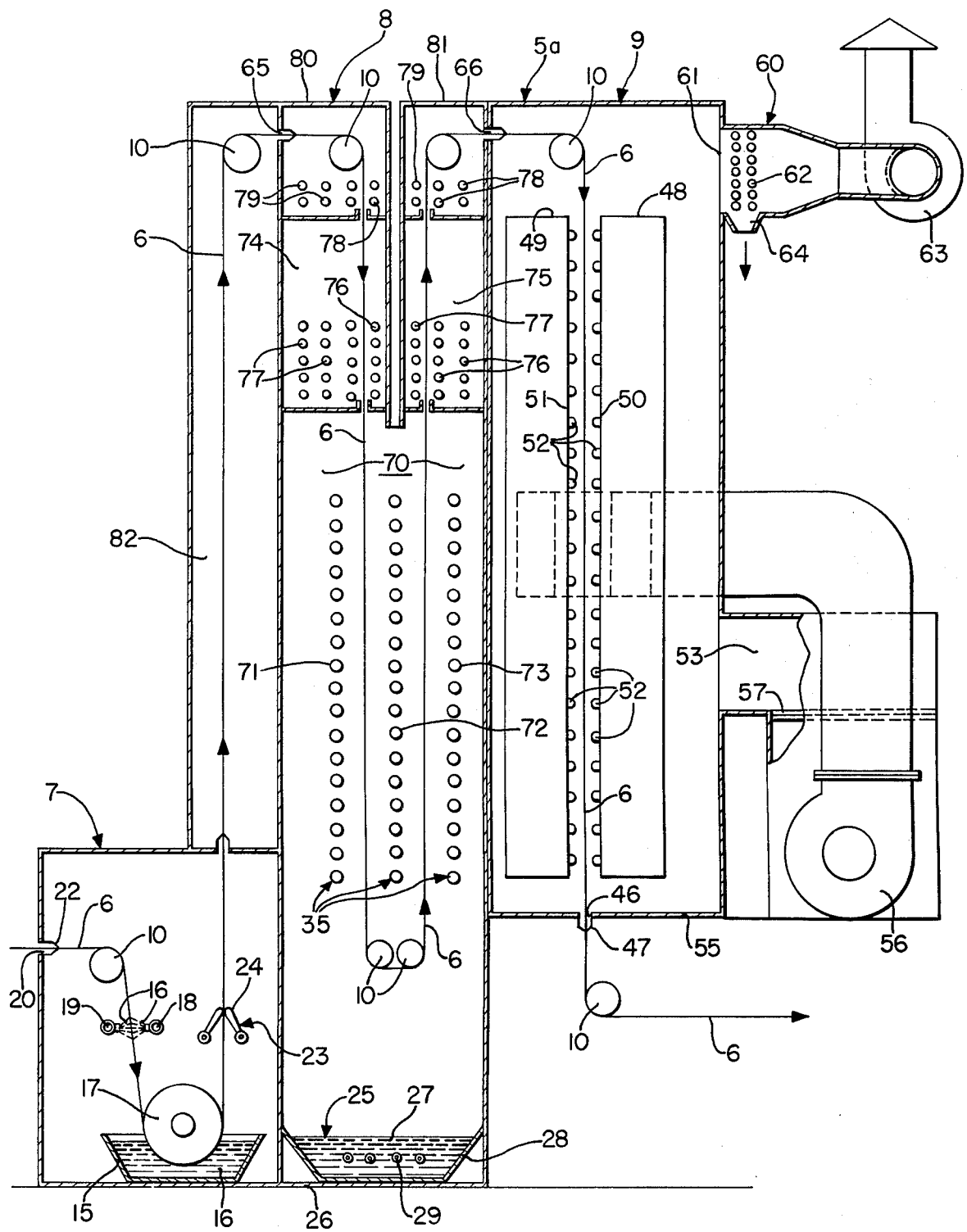
FIG. 2 is a cross-section of another embodiment of the invention.

It should be apparent from the use of like numerals, that the apparatus 5a of FIG. 2 is essentially the same as the apparatus 5 of FIG. 1, except for the location of the fabric inlet and outlet openings 65 and 66 in the drying chamber 8, the number of passes the fabric 6 makes between radiant heaters 35, and certain other details which should be apparent from a comparison of the two FIGS. 1 and 2. The drying chamber 8 (FIG. 2) comprises an enlarged expansion chamber 70 in which three vertically extending banks 71, 72, and 73 of radiant heaters 35 are located. The fabric 6 is guided successively between the banks 71 and 72 and the banks 72 and 73 of radiant heaters 35.

Another distinguishing feature of the apparatus 5a, is the provision of a pair of elongated throat sections or chimneys 74 and 75 which extend vertically above the expansion chamber 70. Condensers 76, 77, and 78, 79 are positioned in each of the chimneys 74 and 75 for condensing solvent vapor accumulating therein near the fabric inlet 65 and fabric outlet 66 which are disposed adjacent the tops 80 and 81 of the chimneys 74 and 75, respectively. It has been found that using the chimneys 74 and 75 produces a more effective condensation of solvent vapor attempting to pass through the fabric inlet and outlet openings 65 and 66.

Still another unusual feature of the apparatus 5a, is the provision between the dip chamber 7 and drying chamber 8 of a vertically elongated soak chamber 82 where the liquid coating is allowed to set up on the fabric 6, prior to moving the fabric 6 into the adjacent drying chamber 8.

Thus, there has been described an apparatus which uses radiant heaters for vaporizing the solvent carrier used in the application of a bonding agent on tire cord fabric.

What is claimed is:

1. An apparatus for treating tire cord fabric, comprising in combination:
   a. means for coating a tire cord fabric with a liquid mixture of an agent for promoting the bond between cords of the fabric and rubber material used in the production of tires, and a vaporizable solvent which is a carrier of the agent;
   b. a drying chamber sealed from the ambient atmosphere and said means, the chamber including an inlet and outlet opening through which the fabric passes as it enters and leaves the chamber, respectively;
   c. means for guiding the fabric successively through the means for coating the fabric and the chamber;

d. means for filling the chamber with vapor of a solvent which is similar to the solvent of the mixture;
e. means for condensing solvent vapor accumulating near the inlet and outlet openings;
f. at least one radiant heater disposed in the chamber in spaced relation from fabric moving past the heater, for heating and vaporizing solvent carrier on the fabric; and
g. means for guiding the fabric between the heaters.

2. The apparatus of claim 1, wherein the heater includes vertically disposed plate coils on either side of the fabric, and means for circulating a heated fluid through the plate coils.

3. The apparatus of claim 2, wherein the circulating fluid is steam.

4. The apparatus of claim 1, wherein the heater includes a series of tube coils on either side of the fabric, and means for circulating a heated fluid through the tube coils.

5. The apparatus of claim 4, wherein the circulating fluid is steam.

6. The apparatus of claim 1, wherein the fabric coating means (a) includes at least one pair of sprays disposed outside the chamber and between which the fabric is guided, for spraying at least a portion of the liquid mixture on the fabric.

7. The apparatus of claim 1, wherein at least the outlet opening through which the fabric passes from the chamber, is disposed vertically above the heater and the means for condensing solvent vapor accumulating near the outlet.

8. The apparatus of claim 7, wherein the means for condensing solvent vapor accumulating near the outlet, includes a primary condenser positioned on either side of the fabric adjacent the fabric outlet, and means for circulating a coolant through the primary condensers.

9. The apparatus of claim 8, which includes a secondary condenser disposed on either side of the fabric between the primary condensers and the fabric outlet, and means for circulating a refrigerated coolant through the secondary condensers.

10. The apparatus of claim 1, which includes a post-drying chamber adjacent the drying chamber, means for guiding the fabric successively through the drying and post-drying chambers, and means for heating the fabric in the post-drying chamber to vaporize any solvent carrier remaining on the fabric after passage through the drying chamber.

11. The apparatus of claim 10, wherein the means for heating the fabric in the post-drying chamber includes means for contacting the fabric with a plurality of spaced streams of heated fluid sufficient to vaporize solvent carrier left on the fabric.

12. The apparatus of claim 11, wherein the means for contacting the fabric in the post-drying chamber with spaced streams of heated fluid, includes a plurality of elongated nozzles which are vertically spaced within the post-drying chamber, the nozzles being coextensive with the width of the fabric and angularly disposed to the direction in which the fabric moves past the nozzles.

13. The apparatus of claim 12, which includes means for exhausting a portion of heated spent fluid, within the post-drying chamber, into the ambient atmosphere and a condenser associated with said exhausting means for condensing solvent vapor attempting to pass into the ambient atmosphere.

14. The apparatus of claim 1, which includes means for removing condensed solvent vapor from the drying chamber, means for separating solvent from impurities in said condensed solvent vapor, and means for reusing at least a portion of said separated solvent in a mixture of solvent and bonding agent.

15. An apparatus for treating tire cord fabric, comprising in combination:
a. means for coating a tire cord fabric with a liquid mixture of an agent for promoting the bond between cords of the fabric and rubber material used in the production of tires, and a vaporizable solvent which is a carrier of the agent;
b. a drying chamber sealed from the ambient atmosphere and said means;
c. means for guiding the fabric successively through the means for coating the fabric and the chamber;
d. means for filling the chamber with vapor of a solvent which is similar to the solvent of the mixture;
e. a pair of spaced chimneys extending vertically above the drying chamber, the chimneys including inlet and outlet openings through which fabric passes as it enters and leaves the drying chamber, respectively;
f. at least one pair of radiant heaters disposed in spaced relation within the chamber and capable of vaporizing solvent carrier on the fabric;
g. means for guiding fabric between the at least one pair of spaced heaters;
h. means for circulating heated fluid through the heaters;
i. at least one pair of primary condensers disposed in spaced relation within each of the chimneys adjacent the openings, for condensing solvent vapor accumulating in the chimneys;
j. means for guiding fabric between the at least one pair of spaced primary condensers in each of the chimneys;
k. means for circulating a cooling fluid through each of the condensers; and
m. means for removing solvent vaor, condensed by the condensers, for conditioning and reuse in the apparatus.

16. The apparatus of claim 15, wherein the means for filling the chamber with solvent vapor includes a sump for holding liquid solvent, disposed in the chamber in farther spaced relation from the chimneys than the heaters, and means for heating and vaporizing liquid solvent in the sump.

17. The apparatus of claim 16, which includes a pair of secondary condensers disposed in each of the chimneys between the openings and primary condensers, each pair of secondary condensers being spaced to allow the passage of fabric therebetween, and means for circulating a refrigerated coolant through the secondary condensers.

18. The apparatus of claim 16, wherein the means for coating the fabric includes at least one pair of nozzles positioned for spraying at least a portion of the liquid mixture against opposite sides of fabric passing between the nozzles.

19. The apparatus of claim 16, wherein each of the radiant heaters includes at least one plate coil.

20. The apparatus of claim 19, wherein steam is circulated through the plate coils.

21. The apparatus of claim 16, wherein each of the radiant heaters includes at least one tube coil.

22. The apparatus of claim 21, wherein steam is circulated through the tube coils.

23. The apparatus of claim 16, which includes a post-drying chamber disposed adjacent the drying chamber and sealed therefrom and the ambient atmosphere, and means for heating the fabric in the post-drying chamber to vaporize any solvent carrier remaining on the fabric.

24. The apparatus of claim 23, wherein the means for heating fabric in the post-drying chamber includes means for directing a plurality of streams of heated fluid against the fabric as it moves through the post-drying chamber.

25. The apparatus of claim 24, wherein the means for directing streams of heated fluid against the fabric includes a plurality of elongated nozzles vertically spaced in the post-drying chamber, the nozzles being coextensive with the width of the fabric and angularly disposd to the direction in which the fabric moves past the nozzles.

26. The apparatus of claim 16, which includes means disposed in the drying chamber for directing at least one stream of superheated vapor of a solvent similar to the solvent of the mixture, against the fabric prior to passing the fabric between the radiant heaters.

* * * * *

UNITED STATES PATENT OFFICE
CERTIFICATE OF CORRECTION

PATENT NO. : 3,924,569
DATED : December 9, 1975
INVENTOR(S) : Edward E. Hunter and Grover W Rye It is certified that error appears in the above-identified patent and that said Letters Patent are hereby corrected as shown below:

Column 5, line 9, change "between" to -- past --;

same line, change "heaters" to -- heater --.

Signed and Sealed this thirteenth Day of April 1976

[SEAL]

Attest:

RUTH C. MASON
Attesting Officer

C. MARSHALL DANN
Commissioner of Patents and Trademarks